M. G. MARTIN.
APPARATUS FOR HIGH TEMPERATURE COOKING.
APPLICATION FILED MAR. 15, 1920.

1,404,456.

Patented Jan. 24, 1922.

INVENTOR.
Monroe G. Martin
BY
ATTORNEYS.

UNITED STATES PATENT OFFICE.

MONROE G. MARTIN, OF EDINBURG, INDIANA.

APPARATUS FOR HIGH-TEMPERATURE COOKING.

1,404,456.   Specification of Letters Patent.   Patented Jan. 24, 1922.

Application filed March 15, 1920. Serial No. 366,016.

*To all whom it may concern:*

Be it known that I, MONROE G. MARTIN, a citizen of the United States, residing at Edinburg, in the county of Johnson and State of Indiana, have invented certain new and useful Improvements in Apparatus for High-Temperature Cooking, of which the following is a specification.

This invention relates to cooking apparatus, more especially to high temperature cooking of foods in sealed containers, such as cans, it being among the objects of this invention to produce an apparatus which is compact, efficient, comparatively simple, and the interior of which is readily accessible. The present invention is in part a continuation of the invention shown in my co-pending application Serial No. 335,207, Patent No. 1,377,088, May 3, 1921, filed November 1, 1919, for high temperature cooking system.

In carrying the objects of my invention into effect, I provide a series of heating baths for the cans which are caused to pass through each of the baths successively with agitation. Preferably, the baths or pans are superposed and the cans caused to travel from the upper to the lower. I generally provide two such pans and an endless carrier operates therein to convey and agitate the cans. Usually a cooling pan is placed below and the cooked cans caused to pass therethrough in order to cool the same.

Figure 1:
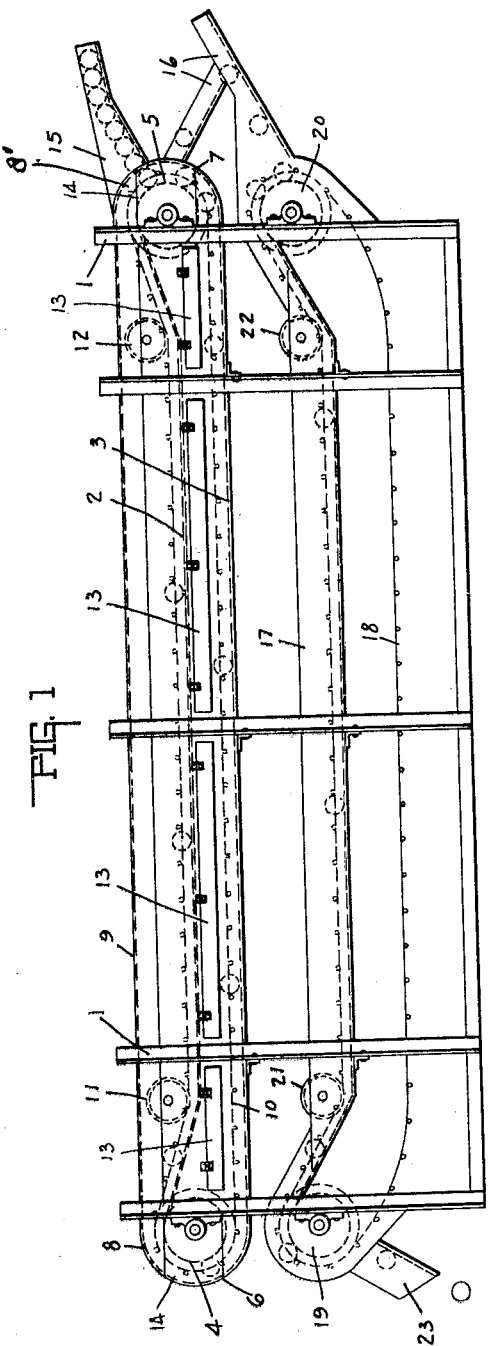
Figure 2:
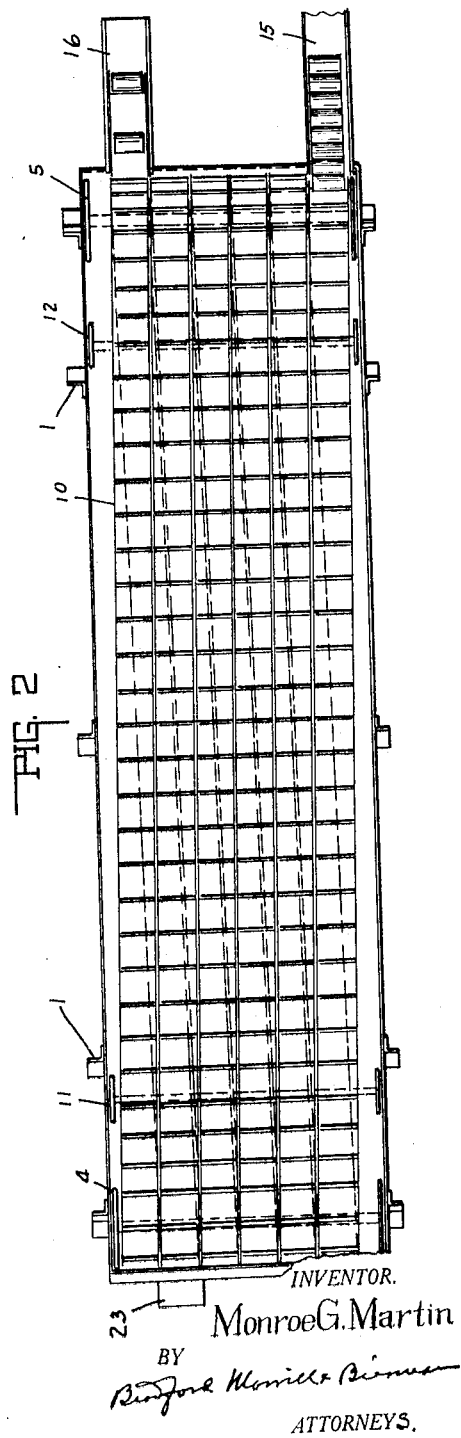

Referring to the accompanying drawings forming a part hereof, and in which similar reference characters denote similar parts, Figure 1, illustrates a side elevation of my apparatus, and Figure 2, a plan view thereof.

The frame 1 of the apparatus has set therein, and secured thereto, pans 2 and 3, the upper pan 2 being preferably, somewhat shorter than the lower pan 3. Wheels or pulleys 4 and 5, for an endless carrier, are secured to the ends of the frame in such a position that the pulleys rest in the lower pan 3. This is extended, as shown at 6 and 7, so as to enclose the pulleys and form the ends of the pan.

The top of the apparatus is closed by a cover 9 preferably made in sections and hinged so that it may be moved to allow access to the upper pan its ends extending over pulleys 4 and 5 at 8, 8'. An endless carrier 10 preferably formed in a spiral, co-operates with pulleys 4 and 5 and passes through both upper and lower pans 2 and 3. Idler wheels 11 and 12 tend to hold the same to the bottom of the upper pan. Side covers 13 and 14, also preferably hinged, are secured at various points on the frame above the level of the liquid in the lower pan and below the upper pan in order to provide openings for ready access to the lower pan for repair or other purposes.

An intake opening 15 for the apparatus is provided at one end so as to allow the feeding of cans to the upper pan and a discharge opening 16 is provided to remove the cooked cans from the lower pan 3. A cooling bath filled preferably with water is provided below the heating pans. The cooling bath consists of a pan 17 similar to the heating pans, but is usually not enclosed. An endless belt 18 operated by pulleys 19 and 20 and held in the pan by idlers 21 and 22 is provided to cause the cans, which are discharged at 16, to be passed through the cooling bath to cool the same. A discharge opening is provided for the exit of the cooled cans.

The above described apparatus is intended for use primarily with a heating bath consisting of oil preferably a light, lubricating fraction of petroleum oil which is substantially non-volatile at the temperature employed. Although I prefer to use such a heating fluid it is obvious that this apparatus is adapted to cooking with the use of other heating means. Although I have shown and described two superposed pans it is to be understood that the form or position thereof may be changed and a greater number of heating pans provided, as desired. The cooling bath may be placed in any position and may consist of one or more pans.

Having thus fully described my said invention, what I claim as new and desire to secure by Letters Patent, is:

A cooking apparatus for canned goods comprising a frame, an upper cooking pan and a longer lower cooking pan supported by the frame, both of said pans extending horizontally across the frame, said upper pan having a movable cover extending the length of the pan, side covers hinged to the frame at various points above the level of the liquid therein and below the upper pan, pulleys at both ends of the frame in such a position that they extend into the lower pan, an endless carrier co-operating with the pulleys passing through both upper and lower pans, idler wheels adapted to hold the carrier to the bottom of the upper pan, means for introducing canned goods to and removing them from the carrier, a cooling bath mounted on the frame beneath the cooking pans and separated therefrom by a free space, an endless carrier in the cooling bath and means to eject the canned goods automatically from the lower pan into the cooling bath, substantially as set forth.

In witness whereof I have hereunto set my hand and seal at Indianapolis, Indiana, this 6th day of March, A. D. nineteen hundred and twenty.

MONROE G. MARTIN. [L. S.]

Witnesses:
H. C. BIERMAN,
M. L. SHULER.